(12) United States Patent
Sternberg et al.

(10) Patent No.: US 7,634,852 B2
(45) Date of Patent: Dec. 22, 2009

(54) METHOD FOR MANUFACTURING LIQUID-COOLED STATOR BARS

(75) Inventors: Lisa Marie Sternberg, Troy, NY (US); William Paul Dobbins, Clifton Park, NY (US); Jeffrey David Sheaffer, Glennville, NY (US); Marc Herbert Rigby, Glenville, NY (US); Alan M. Iversen, Clinton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/462,613

(22) Filed: Aug. 4, 2006

(65) Prior Publication Data
US 2008/0029291 A1 Feb. 7, 2008

(51) Int. Cl.
H01F 7/06 (2006.01)

(52) U.S. Cl. .............. 29/605; 29/596; 29/831; 174/120 R; 310/54

(58) Field of Classification Search ........... 29/596, 29/598, 602.1, 605, 606, 831, 732; 156/53, 156/192; 174/120 R, 120 C, 138 C, DIG. 20; 310/54, 201, 214, 254; 428/324, 363, 377, 428/417
See application file for complete search history.

(56) References Cited

U.S. PATENT DOCUMENTS

| | | | |
|---|---|---|---|
| 3,780,325 A * | 12/1973 | Frankenhauser | 310/214 |
| 3,930,915 A * | 1/1976 | Mendelsohn et al. | 156/53 |
| 4,853,565 A | 8/1989 | Elton et al. | |
| 5,066,881 A | 11/1991 | Elton et al. | |
| 5,175,396 A | 12/1992 | Emery et al. | |
| 5,618,891 A | 4/1997 | Markovitz | |
| 5,723,920 A | 3/1998 | Markovitz et al. | |
| 5,973,269 A | 10/1999 | Draper et al. | |
| 6,043,582 A | 3/2000 | Markovitz et al. | |
| 6,130,496 A * | 10/2000 | Takigawa et al. | 310/215 |
| 6,190,775 B1 * | 2/2001 | Smith et al. | 428/417 |
| 6,359,232 B1 | 3/2002 | Markovitz et al. | |
| 6,420,812 B1 | 7/2002 | Emery | |
| 6,498,415 B1 | 12/2002 | Emery | |
| 6,856,053 B2 * | 2/2005 | LeFlem et al. | 310/54 |
| 7,135,639 B2 * | 11/2006 | Emery | 174/120 R |
| 7,294,788 B2 * | 11/2007 | Yoshida et al. | 174/120 R |

* cited by examiner

Primary Examiner—Donghai D. Nguyen
(74) Attorney, Agent, or Firm—Armstrong Teasdale LLP

(57) ABSTRACT

A method for manufacturing a liquid-cooled stator bar suitable for use in a generator. The method includes providing a stator bar comprising a plurality of conducting strands collectively formed into a desired shape, wherein at least one of the conducting strands is configured to channel a liquid for cooling the stator bar. At least one layer of ground wall insulation is applied to the outer portions of the stator bar, and then at least one layer of a conductive tape is applied to an outer area of the ground wall insulation. The ground wall insulation and the conductive tape are cured.

10 Claims, 3 Drawing Sheets

METHOD FOR MANUFACTURING LIQUID-COOLED STATOR BARS

BACKGROUND OF THE INVENTION

This invention relates generally to a method for applying a conductive material to stator bars, and more specifically, to methods for applying a conductive tape to liquid-cooled stator bars for high-voltage generators.

In at least some known high-voltage generators, a stator yoke surrounds an armature core and partially encloses a plurality of stator bars, which are sometimes referred to as "stator windings" or "armature windings". At least some known stator bars include a plurality of strands of copper conductors that are wound in the armature to form loops. The stator bars are generally positioned in slots of the power generator so that desired voltage and current characteristics can be generated during operation. High-voltage insulation is wrapped around the stator bars to maintain ground insulation between the conductors and the stator core and other grounded objects.

While in the slot of the power generator, stator bars are subject to a cross-slot flux produced by the normal load current. If the stator bars are loose within the slots, vibration or "bar bouncing" caused by the magnetic forces can damage the stator bars. Thus, in order to reduce this motion, the final size of the stator bars must be carefully configured so that the bar is tightly wedged into the slot.

At least some known methods for fabricating stator bars include adding a conductive material or coating in order to prevent corona discharges between the stator bar and stator core laminations. Corona discharges deteriorate the high-voltage insulation which leads to premature failure of the stator bar. Thus, material having a lower resistance than the insulation is applied to the outer surface of the insulation in order to prevent or limit the corona activity.

In one known method, particularly for after-market liquid-cooled stator bars, electrical insulation is first applied around the stator bar. The insulation is then cured in a vacuum-pressure autoclave. After curing in the autoclave, the bar is inspected to confirm that it satisfies dimensional requirements. A conducting adhesive is then applied to the cured ground insulation, followed by wrapping the coated insulation with a glass tape or other material (e.g., fabric, felt, or mat). Typically, the width of the tape is approximately one and a half inches wide, making the process of wrapping the bar labor intensive. After the adhesive and the tape dries, which takes approximately eight hours, a conductive paint is applied to the glass tape. The conductive paint helps obtain the desired surface resistivity for the final stator bar. The paint takes approximately eight hours to dry. In some cases, the bar is held (e.g, on sawhorses) which requires the bar to be moved so that those areas covered by sawhorses can be painted. Another eight hours of curing time is then needed.

After the paint cures, the stator bar is then inspected again to verify the bar is appropriately sized. Furthermore, the stator bar can be surface resistance tested, in order to ensure the surface resistivity is within an appropriate range. Bars are then "high potential" proof tested at elevated voltages relative to operation in order to identify any flawed ground wall insulation.

However, the armoring process described above can be labor intensive. Also, the process requires substantial time in curing the paints and adhesives applied to the stator bars (approximately 16 hours) and substantial time in manually sizing the bar and applying the armor. Lastly, a significant amount of bar handling is required due to the number of process steps for armoring and this presents the potential for handling damage to occur.

Overall, the above process can be inefficient and costly. Furthermore, generators may include a variety of stator bar configurations and/or require a variety of stator bar sizes. As mentioned above, it is important to control the finished size of the bar to prevent them from being loose in the slot. Thus, alternative methods and more cost-efficient methods for manufacturing stator bars and for applying a conductive material are desired.

BRIEF DESCRIPTION OF THE INVENTION

In one aspect, a method for manufacturing a liquid-cooled stator bar suitable for use in a high voltage generator is provided. The method includes providing a stator bar having a plurality of conducting strands collectively formed into a desired shape, wherein at least one of the conducting strands is configured to channel a liquid for cooling the stator bar. At least one layer of ground wall insulation is then applied to outer portions of the stator bar, and at least one layer of a conductive tape is then applied to at least a portion of an outer area of the ground wall insulation. The ground wall insulation and the conductive tape are then processed in an autoclave.

In another aspect, a liquid-cooled stator bar configured to be easily sized for fitting into a slot of a high-voltage generator is provided. The stator bar includes a plurality of conducting strands collectively formed into a desired shape, wherein at least one of the conducting strands is configured to channel a liquid for cooling the stator bar. The stator bar further includes at least one layer of ground wall insulation coupled to outer portions of the collectively formed strands, and two layers of a conductive tape coupled to at least a portion of an outer area of the ground wall insulation, wherein the conductive tape comprises a glass cloth uniformly impregnated with a conducting organic resin. Each layer of the conductive tape has a half-lap configuration on the portion of the ground wall insulation.

In yet another aspect, a method for armoring a liquid-cooled stator bar for a high voltage generator is provided. The method includes providing a conductive tape comprising a glass cloth uniformly impregnated with a conducting organic resin. The method further includes applying two layers of the conductive tape, via a tape machine, to at least a portion of an outer area of the ground wall insulation such that each layer is applied in a half-lapped manner. The total thickness of the two layers is from about 0.035 to about 0.045 inch.

DETAILED DESCRIPTION OF THE INVENTION

Figure 1:
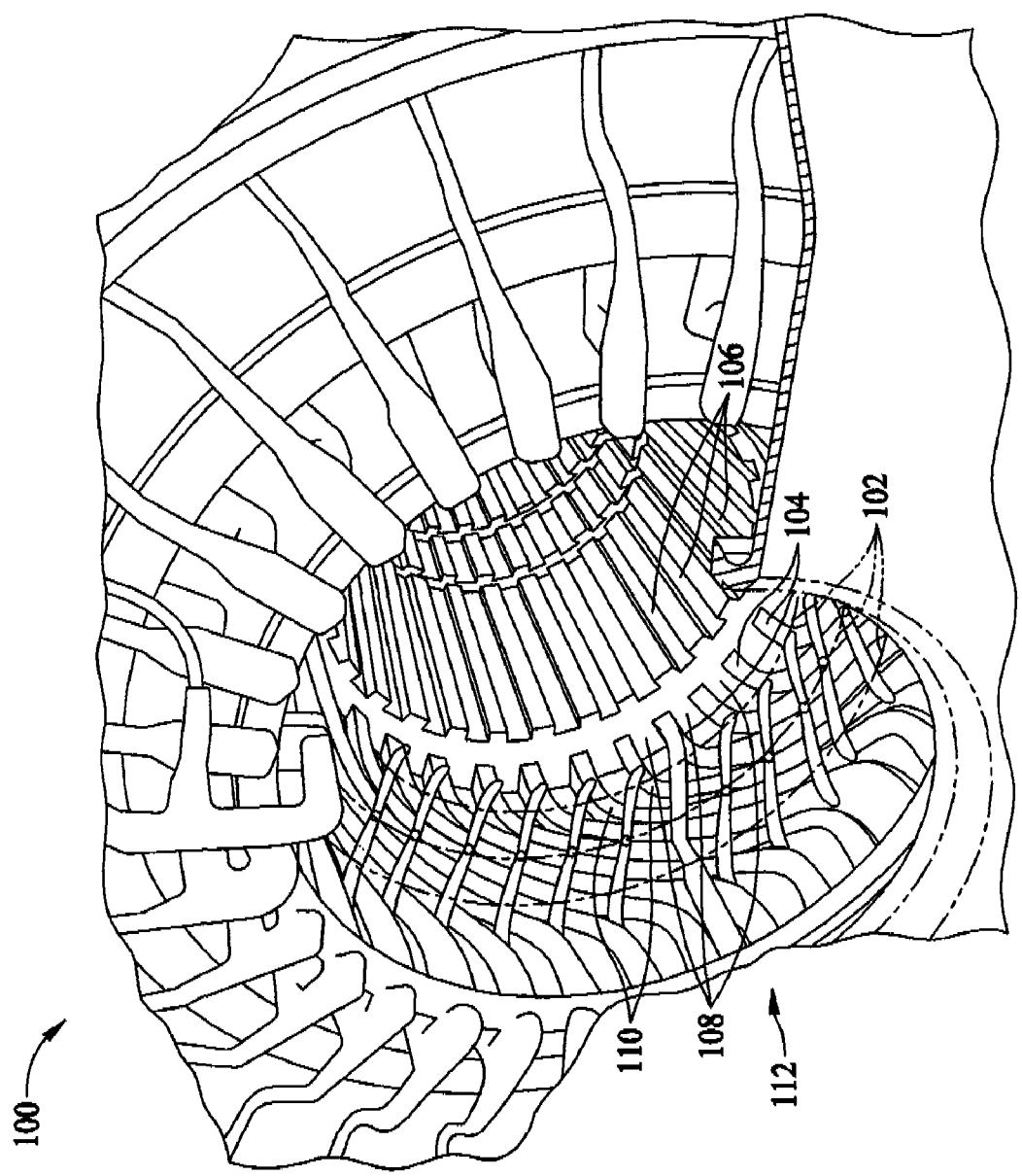
FIG. 1 is a perspective end view of an exemplary generator.

FIG. 1 is a perspective end view of an exemplary generator 100. A cylindrical rotor 102 (transparently represented by dashed lines) is placed within the stator core bore. A plurality of stator bars 104 are positioned in slots 106 defined around an inner circumference of a stator core 108. Each stator bar 104 includes at least one circumferential bend 110 defined between a turbine end 112 and a connection end (not shown) of each bar 104.

Figure 2:
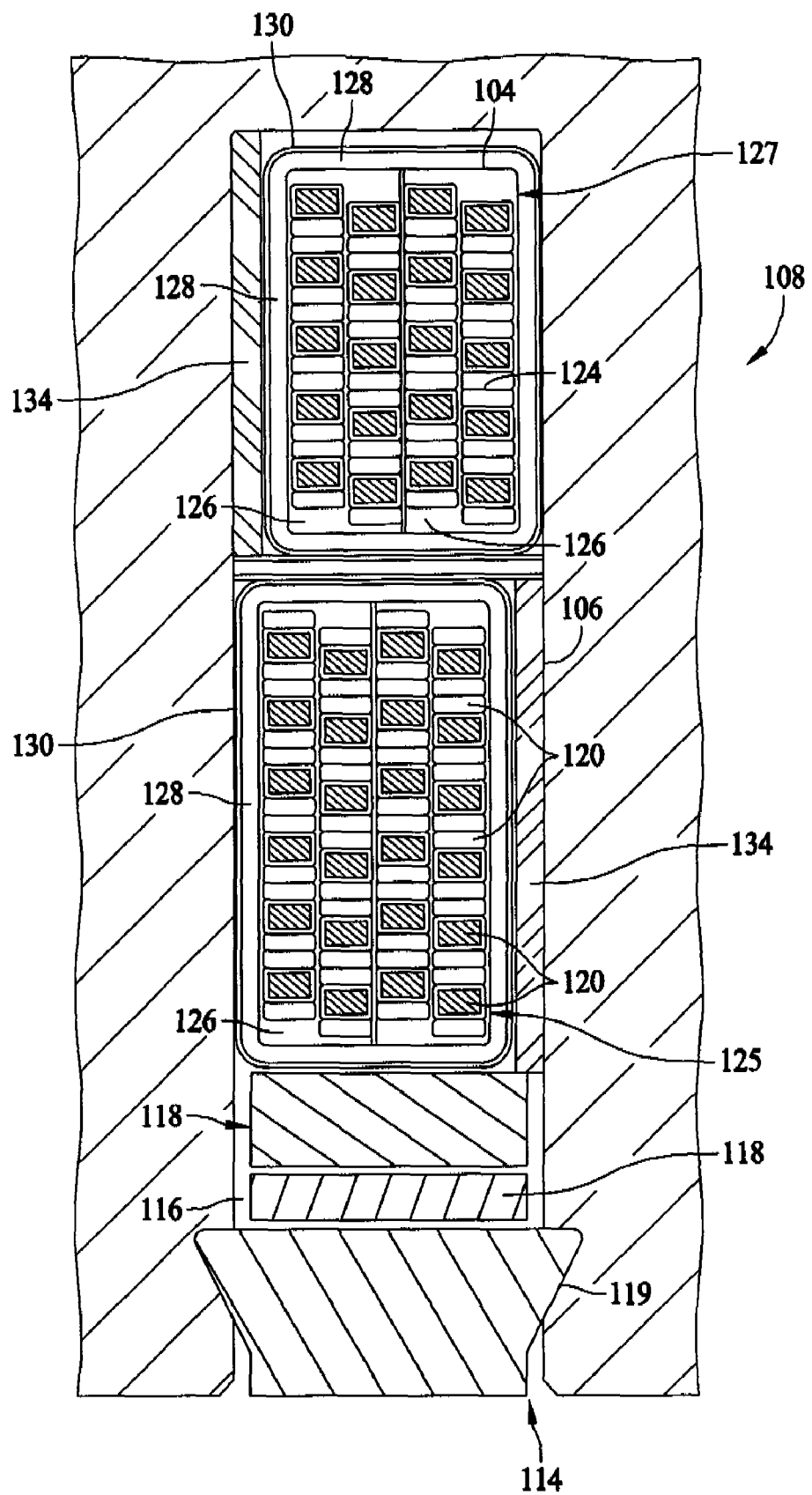
FIG. 2 is an enlarged cross-section of a stator bar according to one embodiment of present invention.

FIG. 2 is a partial cross-section of exemplary stator bars 104 in stator core 108. Stator core 108 includes slots 106 (only one is illustrated) that each include an access opening 114, and a dovetail slot 116 that is adjacent opening 114 and extends generally along slots 106. In the exemplary embodiment, two stator bars 104 are mounted in each slot 106 with one or more packing fillers 118 at opening 114. A dovetail shaped wedge 119 is positioned at least partially within dovetail slot 116. Packing filler(s) 118 and dovetail shaped wedge 119 operate together in applying a radial force to inner and outer stator bars 104 so that bars 104 are retained in slot 106. In one embodiment, packing filler 118 includes a tapered wedge for driving packing filler 118 between wedge 119 and inner stator bar 104 to apply a radial force on inner stator bar 104, which in turn applies a radial force to bottom stator bar 104.

As shown in FIG. 2, a side packing filler 134 (e.g., ripple spring) is inserted along one side of the inner and outer stator bars 104 to ensure good contact between stator bar 104 and core 108. Both packing fillers 134, 118 may be flat or ripple-spring shaped. Furthermore, packing fillers 134 include a semiconducting material to assist with the electrical contact to the stator core. In one embodiment, packing fillers 134 includes a resin-filled glass weave material. Packing filler 118 can optionally include a semiconducting material if desired.

In the exemplary embodiment, stator bars 104 are formed of a plurality of strands 120 of a conducting material that are bundled together prior to form to a pre-determined winding path through stator bar 104. Although strands 120 may be fabricated from several conductive materials, in some embodiments strands 120 are fabricated from copper, copper alloys, or stainless steel. In some embodiments, strands 120 may be cooled. Strands 120 may be cooled in any suitable manner, fashion, and/or by any suitable means. For example, in some embodiments strands 120 are cooled by passing a fluid, such as, but not limited to, air and/or hydrogen gas, over strands 120. Moreover, and for example, in some embodiments some or all of strands 120 are hollow cooling strands 120 that channel a fluid, such as, but not limited to, water, an oil, air, and/or hydrogen gas, for cooling strands 120. In the exemplary embodiment shown in FIG. 2, some of strands 120 are shown as hollow and some of strands 120 are shown as solid. Another example of cooling of strands 120 includes indirect cooling of strands 120, for example by passing a fluid, such as, but not limited to, air and/or hydrogen gas, over stator core 108 to thereby cool strands 120 through conduction between stator core 108 and strands 120.

Adjacent strands 120 are electrically-insulated from each other by an insulating material 124. Although strands 120 may have any shape, in the exemplary embodiment strands 120 are generally rectangular in cross section. Transposition putty material 126 may surround radially inward portions 125 and/or radially outward portions 127 of strands 120 for each stator bar 104 within slots 106. Each stator bar 104 may be surrounded by multiple layers of an electrical insulation 128. The number of layers of insulation 128 and their particular arrangement are variably selectable based upon a design specification for generator 100. Although insulation 128 may include other insulation (e.g., extruded insulation), in one embodiment insulation 128 is fabricated from mica-based materials which include a binder. In one embodiment, insulation 128 is an epoxy-mica system, such as Micapal II™ (a trademark of General Electric Company). In some embodiments, insulation 128 may initially be flexible enough to be wound or wrapped around strands 120, but after curing, may be relatively hard. Although strands 120 may have any shape, in the exemplary embodiment strands 120 are generally rectangular in cross section.

Figure 3:
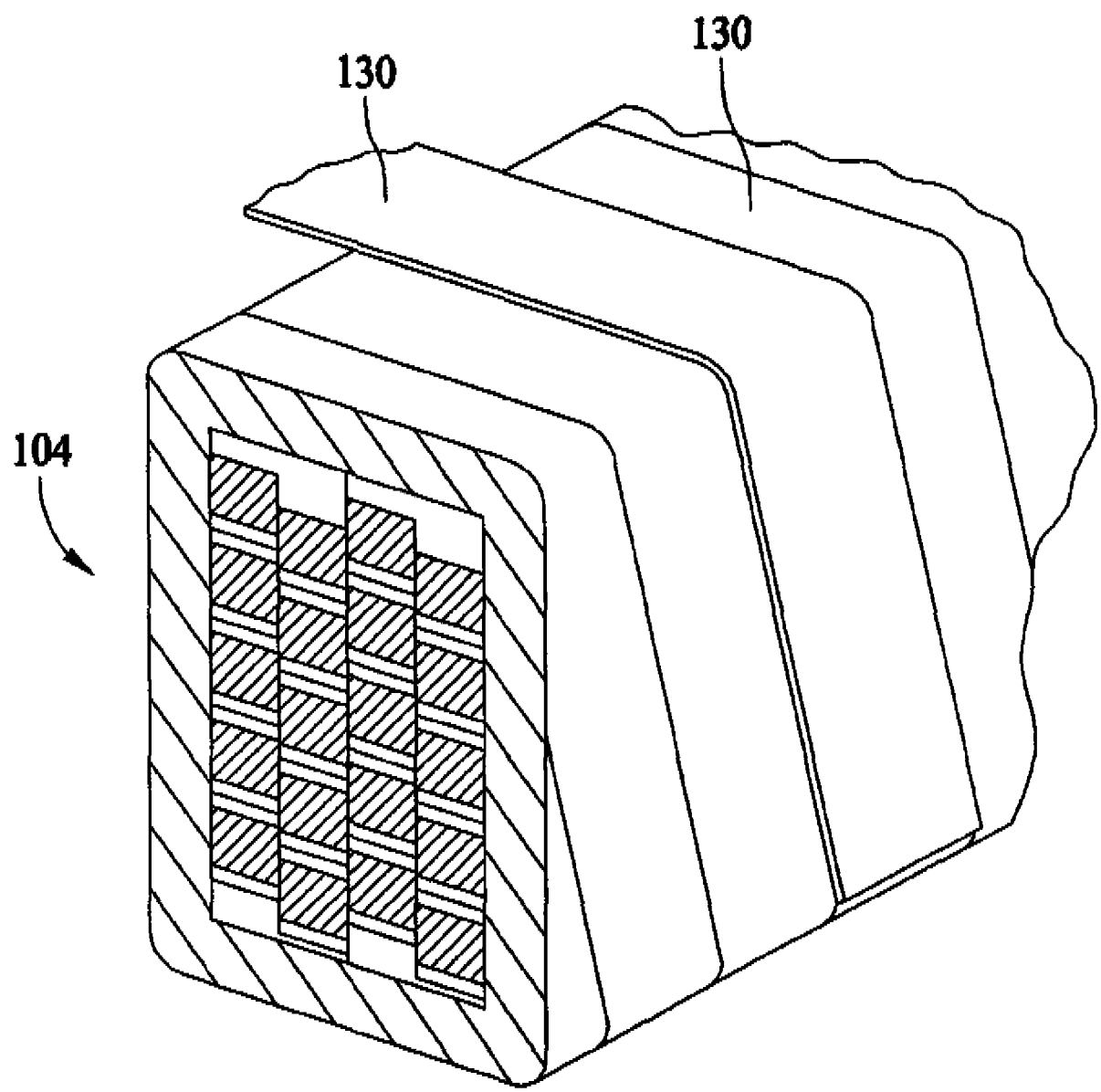
FIG. 3 is illustrates the conductive tape as it is being applied to the stator bar in FIG. 2.

As shown in FIGS. 2 and 3, stator bars 104 include a conductive tape or armor 130. Conductive tape 130 is used on stator bars designed for operation above 1,200 volts in order to provide corona protection. In one embodiment, conductive tape 130 is used on stator bars 104 designed for operation above 2,400 volts AC. More specifically, conductive tape 130 is used on stator bars 104 designed for operation above 5,000 volts AC.

Conductive tape 130 includes cloth and a conductive or semiconductive substance. The cloth may be organic or inorganic, and the substance is an organic resin. In one embodiment, the cloth is inorganic. In one embodiment, conductive tape 130 is a woven glass cloth uniformly impregnated with a conducting epoxy resin.

Prior to curing conductive tape 130 and insulation 128 (discussed below), conductive tape 130 has an average resistivity from about 20,000 to about 200,000 ohms/sq. This average resistivity is calculated with two or four stacked thicknesses of conductive tape 130 (discussed below) on one side of stator bar 104. In one embodiment, conductive tape 130 has about 36% to about 49% binder/organic conductive filler content. In one embodiment, conductive tape 130 has a breaking strength of approximately 140 lbs./in., min., and a roll winding tension of approximately 8 lbs. min. In an exemplary embodiment of conductive tape 130, the thickness, breaking strength, and construction of conductive tape 130 must satisfy the standards in ASTM D579 (Specification for Greige Woven Glass Fabrics).

Conductive tape 130, as applied to insulation 128 of stator bar 104, must have a substantial thickness so as to allow an operator or machine to manipulate the size dimensions of the final stator bar product by removing a portion of conductive tape 130. For example, an operator can remove a few mils of the conductive tape from a length of a side of the stator bar (e.g., by sanding the bar) so that the stator bar will fit into the respective slot of the generator. Because only a small amount or portion of conductive tape 130 is removed, conductive properties of tape 130 are not significantly altered and insulation 128 (and consequently stator bar 104) is still protected.

Unlike previous known methods, conductive tape 130 is applied to insulation 128 on stator bar 104 before insulation 128 is cured. A tape machine (not shown) applies one or more layers of conductive tape 130 to stator bars 104. As shown in FIG. 3, in one embodiment, tape machine applies two separate half-lapped layers of conductive tape 130, around stator bars 104 onto insulation 128. Because each layer is half-lapped, the final stator bar has four layers (or thicknesses) of tape per side, or eight total layers of conductive tape 130 as the total build for stator bar 104. In alternative embodiments, conductive tape 130 is applied side by side, in that each layer of tape butts against another layer of tape. Those skilled in the art and guided by the teachings provided herein know that many arrangements and thicknesses of tape 130 may be used in order to achieve the desired resistivity.

In one embodiment, one half-lapped layer of conductive tape 130, which has two thicknesses of conductive tape 130, has a total thickness from about 0.008 inch to about 0.011 inch. In this embodiment, the thickness of conductive tape 130 is from about 0.004 inch to about 0.006 inch.

The total thickness of the layer(s) of conductive tape 130 is substantial enough so as to allow an operator or machine to manipulate the size dimensions of the final stator bar product by removing a portion of conductive tape 130. In one embodiment, the total thickness of the layer(s) of conductive tape 130 is about 0.035 to about 0.045 inch. More specifically, in one embodiment, the total thickness of the layer(s) of conductive tape 130 is about 0.040 to about 0.045 inch.

In one embodiment two half-lapped layers on one side of stator bar 104 have a total thickness from about 0.016 inch to about 0.022 inch. The total build (i.e., the total thickness of conductive tape 130 used on both sides) has a total thickness from about 0.035 inch to about 0.045 inch.

The width of conductive tape 130 is amenable for applying conductive tape 130 to insulation 128. In one embodiment, the width of conductive tape 130 is amenable for applying conductive tape 130 half-lapped onto insulation 128. In one embodiment, the width of conductive tape 130 is approximately one inch.

Stator bar 104 with insulation 128 and conductive tape 130 is then cured in an autoclave by known processes. In one embodiment, the duration of curing is approximately 20 hours. After curing, stator bar 104 is stripped of sacrifice material.

The curing process alters the resistivity range of conductive tape 130 and, consequently, stator bar 104. Those skilled in the art and guided the teachings herein provided know that the composition of conductive tape 130 and the curing process can be altered to reach a final desired resistivity. The desired resistivity range of the outer surface of stator bar 104 must not be too low so that a current and voltage is induced in the armor by the magnetic field. But the desired resistivity range must not be so high that it prevents discharge of the gas at the surface of stator bar 104. The acceptable resistance range is a function of the distance between a grounding point of conductive tape 130 and the core laminations.

In one embodiment, the desired surface resistivity range is from about 500 to about 100,000 ohms/square. In another embodiment, the desired resistivity range is from about 1,500 to about 100,000 ohms/square.

However, if portions of the cured conductive tape 130 or if all of the cured conductive tape 130 do not meet the desired resistance range, those skilled in the art can alter the resistance through known methods. For example, if the resistance is too high, then coating the bar with a special paint can reduce the resistance. Also, if the resistance is too low, conductive tape 130 can be removed and known glass tape processes discussed above can be used.

After curing, stator bar 104 is inspected for proper size dimensions, the existence of any flaws, and the armor resistivity is tested.

By curing insulation 128 with conductive tape 130, unlike previously known processes, a significant amount of time can be saved and costs reduced.

Several tests known by those skilled in the art, including high potential, dissipation factor and tip-up, voltage endurance, thermal aging, impact damage test, comparative wear, compressive creep tests, and winding assembly simulations, were conducted to ensure that embodiments of the present invention would perform successfully in high-voltage generators.

Exemplary embodiments of methods and stator bars are described and/or illustrated herein in detail. The methods and stator bars are not limited to the specific embodiments described herein, but rather, components of each stator bar and steps of each method may be utilized independently and separately from other components and steps described herein. Each stator bar component and method step can also be used in combination with other stator bar components and/or method steps.

When introducing elements/components/etc. of the methods and assemblies described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the methods and assemblies described herein have been described and/or illustrated in terms of various specific embodiments, those skilled in the art will recognize that the methods and assemblies described and/or illustrated herein can be practiced with modification within the spirit and scope of the claims.

What is claimed is:

1. A method for manufacturing a liquid-cooled stator bar for use in a generator, the method comprises:
   providing a stator bar comprising a plurality of conducting strands collectively formed into a desired shape, wherein at least one of the conducting strands is configured to channel a liquid for cooling the stator bar;
   applying at least one layer of ground wall insulation to outer portions of the stator bar;
   applying at least one layer of a conductive tape to at least a portion of an outer area of the ground wall insulation of the stator bar;
   curing the ground wall insulation and the conductive tape substantially simultaneously in the same curing process; and, configuring the cured stator to a desired size by removing at least a portion of the cured conductive tape from the cured stator bar wherein the desired size is determined from a dimension of a stator slot.

2. A method in accordance with claim 1 wherein said applying the conductive tape comprises applying two half-lapped layers of conductive tape.

3. A method in accordance with claim 2 wherein each half-lapped layer of conductive tape has a thickness from about 0.008 inch to about 0.011 inch.

4. A method in accordance with claim 2 wherein said applying the conductive tape further comprises applying the conductive tape in a half-lapped manner via a tape machine.

5. A method in accordance with claim 4 wherein said applying the conductive tape further comprises applying the conductive tape such that the total thickness of the layers of conductive tape is from about 0.035 to about 0.045 inch.

6. A method in accordance with claim 4 wherein said curing the ground wall insulation and the conductive tape further comprises curing the conductive tape such that a desired resistivity range of an outer surface of the stator bar is from about 1,500 ohms/square to about 100,000 ohms/square.

7. A method in accordance in claim 1 wherein said curing the ground wall insulation and the conductive tape further comprises curing the conductive tape such that a desired resistivity range of an outer surface of the stator bar is from about 1,500 ohms/square to about 100,000 ohms/square.

8. A method in accordance with claim 1 wherein said applying the conductive tape further comprises applying the conductive tape such that the total thickness of the layer(s) of conductive tape is from about 0.035 to about 0.045 inch.

9. A method in accordance with claim 8 wherein said applying the conductive tape further comprises applying the conductive tape wherein the conductive tape comprises a glass cloth uniformly impregnated with a conducting organic resin.

10. A method in accordance with claim 9 wherein said applying the conductive tape further comprises applying the conductive tape wherein the conductive tape comprises from about 36% to about 49% binder content.

* * * * *